United States Patent [19]

Akutagawa

[11] Patent Number: 4,673,377
[45] Date of Patent: Jun. 16, 1987

[54] BELT-PULLEY TYPE STEPLESSLY VARIABLE TRANSMISSION HAVING A REVERSE DRIVE GEAR MECHANISM

[75] Inventor: Hitoshi Akutagawa, Hiroshima, Japan

[73] Assignee: Mazda Motor Corporation, Hiroshima, Japan

[21] Appl. No.: 910,858

[22] Filed: Sep. 24, 1986

Related U.S. Application Data

[63] Continuation of Ser. No. 716,247, Mar. 26, 1985, abandoned.

[30] Foreign Application Priority Data

Mar. 28, 1984 [JP] Japan .................................. 59-61328

[51] Int. Cl.[4] .................. F16H 9/00; F16H 37/06
[52] U.S. Cl. .......................................... 474/1; 74/689
[58] Field of Search ................ 474/1, 7; 74/689, 681, 74/339, 674, 203, 72

[56] References Cited

U.S. PATENT DOCUMENTS

| | | | |
|---|---|---|---|
| 3,145,584 | 8/1964 | Fairbank et al. | 474/1 X |
| 3,670,594 | 6/1972 | Roper | 474/1 X |
| 4,301,902 | 11/1981 | Gatsos et al. | 474/1 X |
| 4,529,393 | 7/1985 | Makishima | 74/689 X |
| 4,548,100 | 10/1985 | Hohn | 74/689 |

FOREIGN PATENT DOCUMENTS 51-33422  3/1976  Japan .

Primary Examiner—Stephen J. Novosad
Assistant Examiner—Thuy M. Bui
Attorney, Agent, or Firm—Fleit, Jacobson, Cohn & Price

[57] ABSTRACT

A belt-pulley type steplessly variable vehicle transmission mechanism including a belt-pulley type transmission and a reverse gear mechanism both connected with an output differential gear device. A selecting mechanism is provided for connecting the input member alternately with the belt-pulley type transmission or the reverse gear mechanism so that the reverse drive can be made at a constant speed ratio.

9 Claims, 2 Drawing Figures

BELT-PULLEY TYPE STEPLESSLY VARIABLE TRANSMISSION HAVING A REVERSE DRIVE GEAR MECHANISM

This application is a continuation of application Ser. No. 716,247 filed Mar. 26th 1985 now abandoned.

BACKGROUND OF THE INVENTION

1. Field of the Invention

The present invention relates to a vehicle power transmission and more particularly to a belt-pulley type steplessly variable power transmission. More specifically, the present invention pertains to a belt-pulley type steplessly variable transmission capable of a reverse drive as well as a forward drive.

2. Description of Prior Art

It has hithertofore been proposed to use a belt-pulley type transmission for automobile driving systems. In such driving systems, the transmission is required to have an ability of transmitting the engine rotation in a reverse direction as well as in a forward direction. For the purpose, the transmission is provided with a reverse drive gear mechanism. For example, Japense patent application 49-105564 filed Sept. 13, 1974 and disclosed for public inspection on Mar. 22, 1976 under the disclosure number 51-33422 discloses a belt-pulley type transmission having a forward-reverse selecting gear mechanism provided between the power clutch and the input member of the belt-pulley mechanism. In the proposed transmission, however, problems have been encountered in that the direction of rotation of the input member of the belt-pulley mechanism is changed between the forward and reverse drive modes. Such change in the direction of rotation of the input member causes a change in the direction of the torque which is being transmitted by the belt so that the life of the belt is shortened to an undesirable extent. Further, in the proposed transmission, the speed ratio is changed not only in the forward drive mode but also in the reverse drive mode. This property is undesirable because the vehicle speed may be increased not under the will of the operator but under the load on the transmission. The problem may be overcome by locking the transmission at a specific speed ratio, however, a complicated locking mechanism is required for the purpose.

OBJECT OF THE INVENTION

It is therefore an object of the present invention to provide a belt-pulley type steplessly variable transmission having a reverse gear mechanism, in which the direction of the torque transmitted through the belt is not changed between the forward and reverse drive modes.

Another object of the present invention is to provide a belt-pulley type steplessly variable transmission capable of forward and reverse drives, in which the speed ratio is fixed to a predetermined value under the reverse drive mode without using any locking means.

A further object of the present invention is to provide a belt-pulley type steplessly variable transmission which is suitable for automobile drive systems.

SUMMARY OF THE INVENTION

According to the present invention, the above and other objects can be accomplished by a steplessly variable power transmission mechanism comprising an input member, a belt-pulley type transmission having an input shaft carrying driving pulley means of a variable effective diameter, an output shaft carrying driven pulley means of a variable effective diameter and belt means connecting the driving and driven pulley means so that power can be transmitted between the driving and driven pulley means, reverse gear means, output means connected with said output shaft of the belt-pulley type transmission and said reverse gear means, selecting means for connecting said input member selectively with one of said input shaft of the belt-pulley type transmission and said reverse gear means whereby driving power is transmitted from said input member through said reverse gear means to said output means when the reverse gear means is selected.

When the transmission mechanism is designed for an automobile use, the input member may be a part of or connected with a power clutch or a hydraulic torque converter which transmits the engine power to the transmission mechanism. The output means may then be differential gear means having one input member and two output members, the input member being connected with said output shaft of the belt-pulley type transmission and the reverse gear means.

The above and other objects and features of the present invention will become apparent from the following descriptions of a preferred embodiment taking reference to the accompanying drawings.

DESCRIPTION OF THE PREFERRED EMBODIMENT

Figure 1:
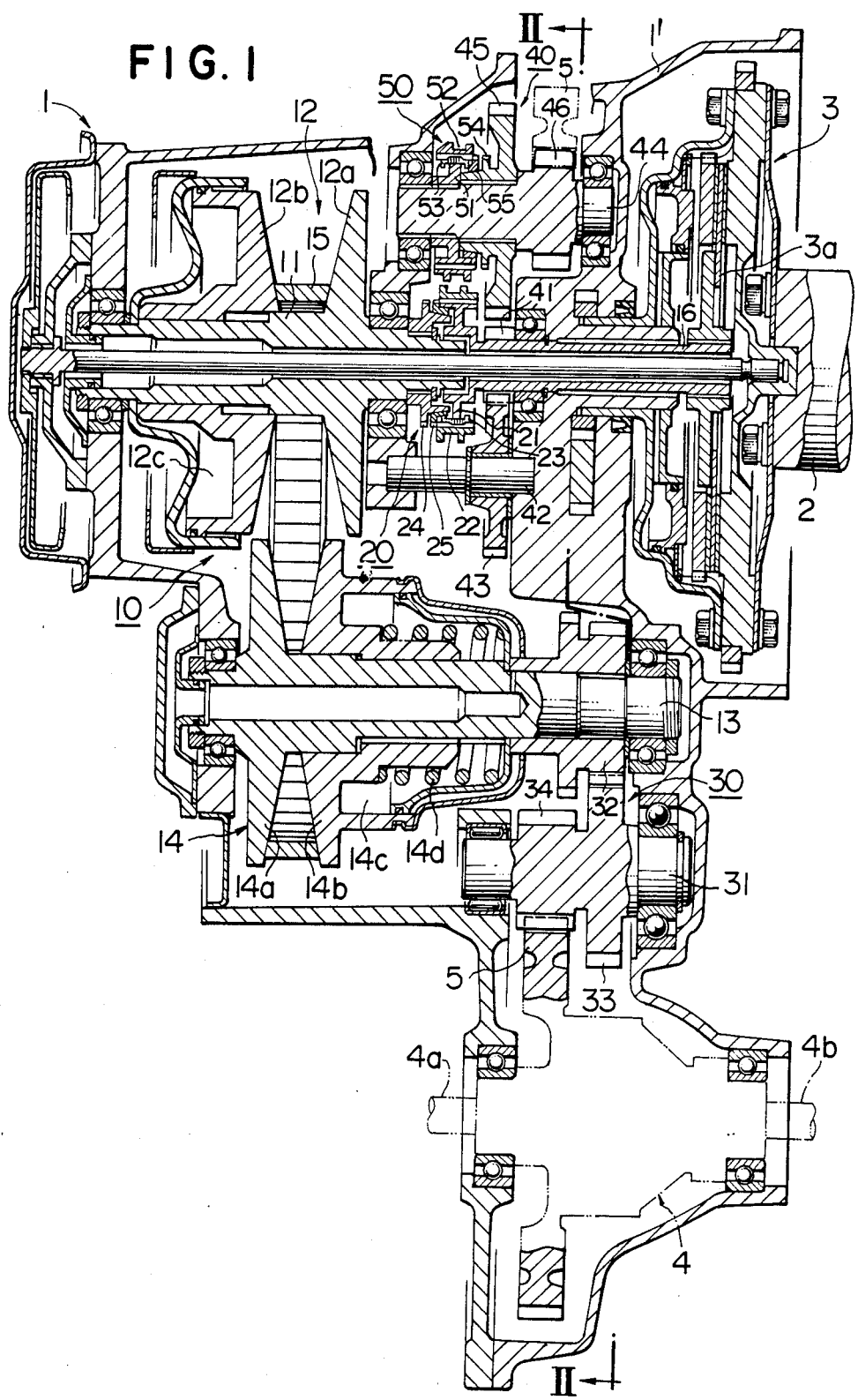
FIG. 1 is a sectional view of a transmission mechanism in accordance with one embodiment of the present invention, the section being extended for the purpose of clarity; and, FIG. 2 is a sectional view taken substantially along the line II—II in FIG. 1.
Figure 2:
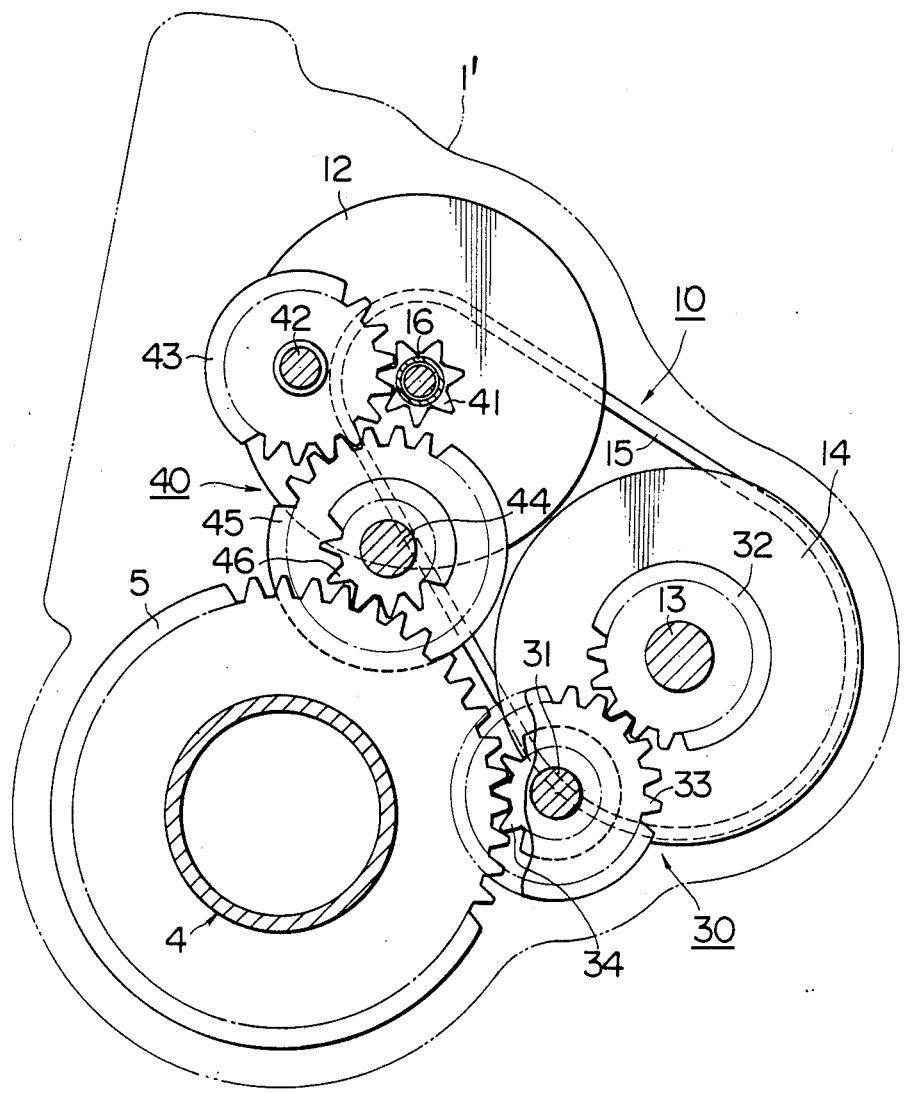

Referring to the drawings, particularly to FIG. 1, there is shown a transmission mechanism 1 having a power clutch 3 connected with an engine output shaft 2. The clutch 3 may be substituted by a fluid coupling or a hydraulic torque converter. The transmission mechanism 1 includes a belt-pulley type, steplessly variable transmission assembly 10 which comprises a driving pulley assembly 12 and a driven pulley assembly 14 which are connected together by an endless belt 15. The driving pulley assembly 12 includes a fixed disc 12a having an input shaft 11 integrally formed therewith and a movable disc 12b mounted on the input shaft 11 for axially slidable movement with respect to the fixed disc 12a. The input shaft 11 is arranged coaxially with the clutch 3. The discs 12a and 12b have frustoconical side surfaces which are confronting with each other to define a circumferential groove of a substantially V-shaped cross-section therebetween.

The driven pulley assembly 14 comprises a fixed disc 14a having an output shaft 13 integrally formed therewith and a movable disc 14b mounted on the output shaft 13 for axially slidable movement with respect to the fixed disc 14a. The output shaft 13 is arranged in parallel with the input shaft 11. The discs 14a and 14b have frustoconical side surface which are confronting with each other to define a circumferential groove of a substantially V-shaped cross-sectional configuration. The endless belt 15 is engaged with the circumferential grooves in the driving and driven pulley assemblies 12 and 14 to transmit driving torque from the pulley assembly 12 to the pulley assembly 14. The speed ratio of the transmission assembly 10 is determined by the effective diameters of the pulley assemblies 12 and 14, that is, by the axial positions of the movable discs 12b and 14b.

In order to determine the axial position of the movable disc 12b in the driving pulley assembly 12, there is provided a hydraulic pressure chamber 12c behind the disc 12b so that the disc 12b is forced under the hydraulic pressure in the chamber 12c toward the fixed disc 12a. The axial position of the movable disc 12c is therefore determined by the pressure in the chamber 12c. As well known in the art, the pressure in the chamber 12c is determined in accordance with the vehicle operating condition so that the axial position of the disc 12b and therefore the speed ratio of the transmission assembly 10 can be determined appropriately in accordance with the vehicle operating condition.

The driven pulley assembly 14 is also provided with a hydraulic pressure chamber 14c behind the movable disc 14b. In the chamber 14c, there is a spring 14d which forces the movable disc 14b toward the fixed disc 14a. A hydraulic pressure is applied to the chamber 14c so as to force the movable disc 14b toward the fixed disc 14a. Thus, the spring 14d and the pressure in the chamber 14c determines the tension in the belt 15.

The transmission mechanism 1 has an input member 16 which is connected at one end with a clutch disc 3a in the power clutch 3 and arranged coaxially with the input shaft 11 of the transmission assembly 10. As shown in FIG. 1, the other end of the input member 16 is in an abutting relationship with an end of the input shaft 11. Between the input member 16 and the input shaft 11, there is provided a first selecting device 20 which includes a conventional synchronizer mechanism comprising a clutch hub 21 formed on the end of the input member 16, a sleeve 22 splined to the clutch hub 21, a key 23 provided between the hub 21 and the sleeve 22, a splined gear 24 mounted on the end of the input shaft 11 and engageable with internal spline teeth formed on the sleeve 22, and a synchronizer ring 25 engaged with a conical boss formed on the gear 24. The synchronizer mechanism may be of a well known type which is widely used in gear shift mechanisms of conventional vehicle transmission gear devices. The sleeve 22 is engaged with a shift fork (not shown) so as to be axially actuated thereby between a disengaged position as shown in FIG. 1 and an engaged position wherein it engages the splined gear 24 to connect the hub 21 with the gear 24. When the sleeve 22 is forced from the disengaged position shown in FIG. 1 toward the gear 24, the key 23 functions to force the synchronizer ring 25 to the conical boss on the gear 24 to thereby synchronize the rotation of the gear 24 with that of the hub 21 so that the sleeve 22 can be smoothly engaged with the gear 24.

The output shaft 13 of the transmission assembly 10 is connected through a first output gear mechanism 30 with a differential gear mechanism 4. The gear mechanism 30 has a gear 32 which is secured to the output shaft 13. The gear 32 is in a meshing engagement with a gear 33 provided on a first counter shaft 31 which is in parallel with the output shaft 13. The first counter shaft 13 is also provided with a first output gear 34 which is in meshing engagement with a final gear 5 which constitutes an input member of the differential gear mechanism 4. As well known in the art, the differential gear mechanism 4 has two output members 4a and 4b for driving vehicle wheels.

Between the input member 16 and the differential gear mechanism 4, there is further provided a second output gear mechanism or a reverse gear mechanism 40. The gear mechanism 40 comprises a drive gear 41 provided on the input member 16 and an idler gear 43 provided on an idler shaft 42 parallel with the input member 16. The idler gear 43 is engaged on one hand with the driving gear 41 and on the other hand with a second idler gear 45 provided on a second idler shaft 44 which is also parallel with the input member 16. On the second idler shaft 44, there is further provided a second output gear 46 which is engaged with the final gear 5. The second idler gear 45 is rotatably mounted on the shaft 44 and there is provided between the shaft 44 and the gear 45 a second selecting device 50 which is similar to the first selecting device 20. More specifically, the second selecting device 50 is located in substantially the same plane as the first selecting device 20 and includes a synchronizer mechanism comprising a clutch hub 51 secured to the shaft 44, a sleeve 52 splined to the clutch hub 51, a key 53 provided between the clutch hub 51 and the sleeve 52, a splined gear 54 formed on the second idler gear 45 and a synchronizer ring 55 engageable with a conical boss on the gear 54. The sleeve 52 is provided with a shift fork so as to be moved axially between a disengaged position shown in FIG. 1 and an engaged position wherein the sleeve 52 engages both the clutch hub 51 and the gear 54 to connect the gear 45 with the shaft 44. The selecting mechanism is such that the selecting devices 20 and 50 can be actuated alternately to the engaged position.

In operation, when the sleeve 22 of the first selecting device 20 is moved into the engaged position, the input member 16 is connected with the input shaft 11 of the transmission assembly 10 so that the driving torque from the engine output shaft 2 is transmitted to the driving pulley assembly 12. Thus, the power is transmitted from the driving pulley assembly 12 through the belt 15 to the driven pulley assembly 14. Thus, the final gear 5 is driven through the first output gear mechanism 30 in the forward drive direction. The speed ratio of the transmission assembly 10 is appropriately determined in accordance with the vehicle operating condition as previously described.

When the sleeve 22 of the first selecting device 20 is moved to the disengaged position and the sleeve 52 of the second selecting device 50 is moved to the engaged position, the input member 16 is connected through the gears 41, 43 and 45 with the shaft 44. Thus, the engine output torque is transmitted through the gear 46 to the final gear 5 to rotate the gear 5 in the reverse drive direction. At this instance, the speed ratio between the input member 16 and the final gear 5 is maintained at a fixed value. The rotation of the final gear 5 drives the belt-pulley type transmission assembly 10 in the reverse direction. However, since no load is applied to the transmission assembly 10, the belt 15 is not subjected to a high tensile load in the reverse drive direction. Therefore, the life of the belt 15 can be increased.

The invention has thus been shown and described with reference to a specific embodiment, however, it should be noted tha the invention is in no way limited to the details of the illustrated structures but changes and modifications may be made without departing from the accompanying claims.

I claim:

1. A steplessly variable power transmission mechanism comprising an input member, a belt-pulley type transmission having an input shaft for carrying driving pulley means of a variable effective diameter, an output shaft for carrying driven pulley means of variable effective diameter and belt means for connecting the driving and driven pulley means so that power can be transmitted between the driving and driven pulley means, reverse gear means provided with a first idler shaft having an idler gear means for engaging with said input member and a second idler shaft having an intermediate gear means in engagement with the idler gear means of the first idler shaft, said first and second idler shafts being disposed in parallel with said input member, output means connected with said output shaft of the belt-pulley type transmission and said reverse gear means, first selecting means provided on said input member for connecting said input member with said input shaft of the belt-pulley type transmission, second selecting means provided on said first idler shaft for connecting said intermediate gear means of the second idler shaft with said idler gear means of the first idler shaft, said first and second selecting means being located within substantially the same plane perpendicular to the longitudinal direction of the input member, said first and second selecting means being adapted to be actuated alternately to the respective engaged positions thereof, whereby driving power is transmitted from said input member through said reverse gear means to said output means in bypassing the belt-pulley type transmission when the reverse gear means is actuated.

2. A power transmission mechanism in accordance with claim 1 which is applied to a vehicle drive system and in which said belt-pulley type transmission includes hydraulic means for determining the effective diameters of said driving and driven pulley means, said output means including a differential gear mechanism.

3. A power transmission mechanism in accordance with claim 1 in which said input member includes a driving gear which is engaged with said idler gear on the second counter shaft.

4. A power transmission mechanism in accordance with claim 1 in which said first and second selecting devices respectively include synchronizer mechanisms.

5. A power transmission mechanism in accordance with claim 1 which includes a first output gear mechanism between said driven pulley means of the belt-pulley type transmission and said output means.

6. A power transmission mechanism in accordance with claim 5 in which said first output gear mechanism includes a first counter shaft having a first output gear engaged with said driven pulley means and said output means.

7. A power transmission mechanism in accordance with claim 6 in which said reverse gear means includes a second counter shaft having an idler gear engaged with a driving gear provided on the input member and a third counter shaft having an intermediate gear engaged with said idler gear and a second output gear engaged with said output means.

8. A steplessely variable power transmission mechanism comprising a belt-pulley type transmission having an input shaft carrying driving pulley means of a variable effective diameter, an output shaft carrying driven pulley means of a variable effective diameter and belt means connecting the driving and driven pulley means so that power can be transmitted between the driving and driven pulley means, a power clutch for controlling transmission of driving power from an engine, a first counter shaft in parallel with the output shaft, a first output gear provided on the first counter shaft to thereby connect the output shaft with a final gear, an input member disengageably connected to the input shaft for transmitting the driving power, gear means provided with a first idler shaft having an idler gear means for engaging with said input member and a second idler shaft having an intermediate gear means in engagement with the idler gear means of the first idler shaft, said first and second idler shafts being disposed in parallel with said input member, a second output gear provided on the first counter shaft and connected to the final gear, a selecting means provided with first selecting means and second selecting means for selecting one of two power transmitting mechanisms, said first selecting means provided on said input member for connecting said input member with said input shaft of the belt-pulley type transmission, said second selecting means provided on said first idler shaft for connecting said intermediate gear means of said second idler shaft with said idler gear means of said first idler shaft, said first and second selecting means being located within substantially the same plane perpendicular to the longitudinal direction of the input member, said first and second selecting means being adapted to be actuated alternately to the respective engaged positions thereof, wherein a first power transmitting mechanism is adapted to transmit the power from the input member to the input shaft and a second power transmitting mechanism is adapted to transmit the power from the input member to the second output gear of the second counter shaft through said gear means.

9. A steplessly variable power transmission mechanism comprising an input member, a belt-pulley type transmission having an input shaft carrying driving pulley means of a variable effective diameter, an output shaft carrying driven pulley means of a variable effective diameter and belt means connecting the driving and driven pulley means so that power can be transmitted between the driving and driven pulley means, reverse gear means provided with a first idler shaft having an idler gear means for engaging with said input member and a second idler shaft having an intermediate gear means in engagement with the idler gear means of the first idler shaft, said first and second idler shafts being disposed in parallel with said input member, said reverse gear means being independent of said input shaft and engageable with said input member, output means connected with said output shaft of the belt-pulley type transmission and said reverse gear means, selecting means provided with first selecting means and second selecting means for connecting said input member selectively with one of said input shaft of the belt-pulley type transmission and said reverse gear means, said first selecting means provided on said input member for connecting said input member with said input shaft of the belt-pulley type transmission, said second selecting means provided on said second idler shaft for connecting an intermediate gear means of the second idler shaft with said idler gear means of the first idler shaft, said first and second selecting means being located within substantially the same plane perpendicular to the longitudinal direction of the input member, said first and second selecting means being adapted to be actuated alternately to the respective engaged positions thereof, whereby driving power is transmitted from said input member to said output means through said belt-pulley type transmission to drive said output means in a first direction of rotation and to said output means through said reverse gear means to drive said output means in an opposite direction of rotation without subjecting said belt means to a high tensile load.

* * * * *